United States Patent [19]

Neeley

[11] Patent Number: 4,692,906
[45] Date of Patent: Sep. 8, 1987

[54] OCEAN BOTTOM SEISOMETER
[75] Inventor: Walter P. Neeley, Irving, Tex.
[73] Assignee: Mobil Oil Corporation, New York, N.Y.
[21] Appl. No.: 808,704
[22] Filed: Dec. 13, 1985

Related U.S. Application Data
[63] Continuation-in-part of Ser. No. 568,305, Jan. 4, 1984, abandoned.

[51] Int. Cl.$^4$ .............................................. G01V 1/38
[52] U.S. Cl. ..................................... 367/15; 114/333; 181/122; 367/133; 367/173; 367/188; 441/29
[58] Field of Search ........................................ 367/2-4, 367/14-18, 131, 133, 134, 165, 173, 188, 191; 181/110, 122, 400, 401, 402; 114/314, 257, 349, 333; 441/38, 29; 405/185, 188, 189

[56] References Cited
U.S. PATENT DOCUMENTS

| | | | |
|---|---|---|---|
| 3,130,703 | 4/1964 | Thompson | 89/1.14 X |
| 3,248,939 | 5/1966 | Silverstein | 367/15 X |
| 3,293,676 | 12/1966 | Link | 367/133 X |
| 3,299,398 | 1/1967 | Hersey et al. | 367/3 |
| 3,316,531 | 4/1967 | Baker | 367/133 X |
| 3,369,368 | 2/1968 | Wilson | 114/333 X |
| 3,719,048 | 3/1973 | Arne et al. | 441/29 X |
| 3,722,014 | 3/1973 | Hill et al. | 367/133 X |
| 3,854,116 | 12/1974 | Toulis et al. | 367/133 X |
| 4,138,658 | 2/1979 | Avedik et al. | 367/15 |
| 4,216,535 | 8/1980 | Bennett | 367/4 |
| 4,217,066 | 8/1980 | Gunther | 405/185 |
| 4,266,500 | 5/1981 | Jurca | 114/333 |
| 4,446,537 | 5/1984 | Bowden et al. | 367/15 |
| 4,462,094 | 7/1984 | Bowden et al. | 181/401 X |

OTHER PUBLICATIONS

Steinmetz et al, "Soil Coupling of a Strong Motion, Ocean Bottom Seismometer", Offshore Technology Conf., 5/3/79.

Primary Examiner—Deborah L. Kyle
Assistant Examiner—John E. Griffiths
Attorney, Agent, or Firm—Alexander J. McKillop; Michael G. Gilman; George W. Hager, Jr.

[57] ABSTRACT

An improved ocean bottom seismometer is disclosed wherein a skirted spherical configuration provides bottom weight and provides a sealed area for seawater ballast which may be ejected to provide positive buoyancy for retrieval.

16 Claims, 6 Drawing Figures

OCEAN BOTTOM SEISOMETER

CROSS-REFERENCE TO RELATED APPLICATION

This application is a continuation-in-part of application Ser. No. 568,305, filed Jan. 4, 1984, abandoned.

BACKGROUND OF THE INVENTION

The present invention pertains to subsea containers and, more particularly, to subsea containers that are unmanned and are used to house equipment that is deployed, performs a function, such as seismic data collection, and is retrieved to withdraw the acquired data at a subsequent time.

Data acquisition systems, such as Ocean Bottom Seismometers, referred to as "OBS", are deployed at a location to detect and store seismic acoustic pulses. The ocean bottom seismometers are normally deployed at a location several miles distant from seismic acoustic pulse generators, such as air guns, which may be towed by a marine vessel.

Presently, there are several types of containers in which data gathering equipment, such as seismic data detection systems, are housed for subsea application. These containers usually involve a pressurized housing having an acoustic pulse detector attached, power supply and tape recorder or some type of data storage within. Problems with these containers occur in several areas. First, withdrawing the data from the container usually requires that the unit be opened to the atmosphere. Data is usually retained by a tape recorder, and the tape must be physically removed to allow playback for further processing. A door is thus provided with seals to protect the internal equipment from the corrosive effects of seawater and to prevent shorting of various electrical components. Opening the compartment door frequently, each time the OBS is used, causes wear on the seals provided and can result in seal failure when exposed to the high pressures encountered in subsea use. Replacement of the door seal is a possible solution, but it requires additional man-hours in assuring proper placement of the seals and waste in replacing seals that might not fail.

Maintenance of ocean bottom seismometer units adds another complication to the problem of door seals. A great deal of sophisticated electronic equipment along with the tape recorder is contained in an ocean bottom seismometer. As such, a power supply, normally a battery pack, must be provided. Generally, the power supply is located in the compartment with the recording unit to provide power for the seismic data acquisition system. Not only must the door be opened to physically remove the tapes from a tape recorder, but the door must also be opened to monitor and service the power supply.

A second problem occurs in the deployment and retrieval of ocean bottom seismometers, one which is environmental related. When an OBS unit is used in an area having a muddy, almost a slurry, bottom, an OBS unit may sink into the bottom and retrieval may be hampered by the suction force exerted by the mud. An ocean bottom seismometer, being used to collect seismic data, must be firmly coupled to the earth. Since it is being used on the bottom below the surface of the ocean, it must weigh more than the water which its volume displaces. Furthermore, it must have a significant subsurface weight to resist the forces of ocean bottom currents. A slurry mud bottom does not provide a hard surface upon which the ocean bottom seismometer may rest. As a result, an OBS unit sinks into the mud to a point of density equilibrium. Where the density of the medium around the ocean bottom seismometer is equal to that of the unit itself. When an OBS unit is to be retrieved, the thick mud slurry may exert a suction force preventing a rise to the ocean surface.

In prior art, a simple release of ballast has been used to increase the ocean bottom seismometer's buoyancy to return to the surface. These methods have not always been successful; not only for mud problems, but also due to possible release mechanism failure.

SUMMARY OF THE INVENTION

The present invention provides a method and apparatus for an improved ocean bottom seismometer having increased reliability of retrieval while eliminating the need to open the unit to remove the data acquired, yet giving access to individual component replacement or repair as required. A generally spherical-shaped housing is divided inside into two parts, a data acquisition part and a ballast part. A conical skirt is fixed around the lower ballast part. Attached to and inside the skirt are spherical compartments containing compressed gas spheres, power supply spheres, gas manifolding and electrical distribution devices. The ballast part is filled with seawater prior to deployment to provide negative buoyancy allowing the ocean bottom seismometer to sink and rest on the ocean bottom. When seismic data has been collected, a signal is transmitted to a receiving device within the acquisition compartment to release the compressed gas within the gas spheres into the ballast part. The spheres contain compressed gas exceeding the amount required to fill the ballast part. A one-way relief valve directs ballast flow and excess gas downward from the ocean bottom seismometer to provide additional lifting force under the skirt.

Electrical connectors are provided which penetrate the acquisition part wall and seal out seawater while allowing electrical access to the acquisition electronics. These accesses are for power supply, control signals and data input/output.

DESCRIPTION OF THE PREFERRED EMBODIMENT

Figure 1:
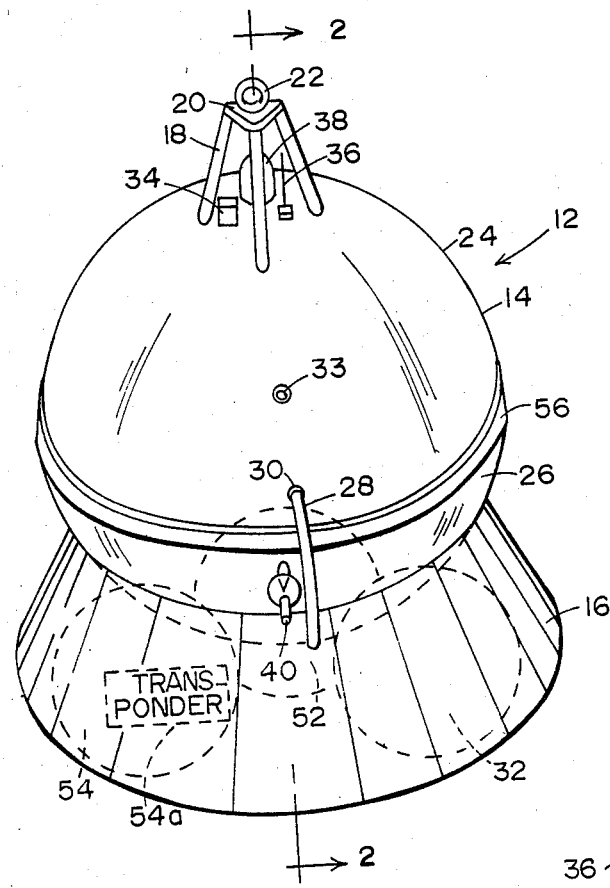
FIG. 1 is a perspective view of an ocean bottom seismometer unit.

The present invention provides a reliable, relatively lightweight, self-contained ocean bottom seismometer which obtains seismic acoustic data and retains this data for subsequent withdrawal while maintaining the watertight integrity of the unit. Referring to FIG. 1, an ocean bottom seismometer unit 12 is illustrated as comprising a large spherical compartment 14 mounted on a conical skirt 16 with a tripod 18 mounted thereon opposite skirt 16. A lifting hook 22 is fixed to a base 20 of tripod 18. Spherical compartment 14 is formed by two hemispheres 24 and 26. Hemisphere 24 is illustrated as having electrical cable 28 connected to terminal 30 from an auxiliary compartment 32. Mounted on top of hemisphere 24 and underneath tripod 18 are hydrophone 34, antenna 36 and radio signal beacon 38.

Hemisphere 26 is illustrated as having a fill nozzle 40, valves 42 and 44 (see FIG. 2) and differential pressure relief valve 46. High-pressure hoses 48 and 50 are connected between spherical compartment 52 and hemisphere 26.

Hemisphere 24 and hemisphere 26 are held together by a band 56, which may be of any suitable material and may be screwed in place. This is to allow repair access inside sphere compartment 14.

Figure 2:
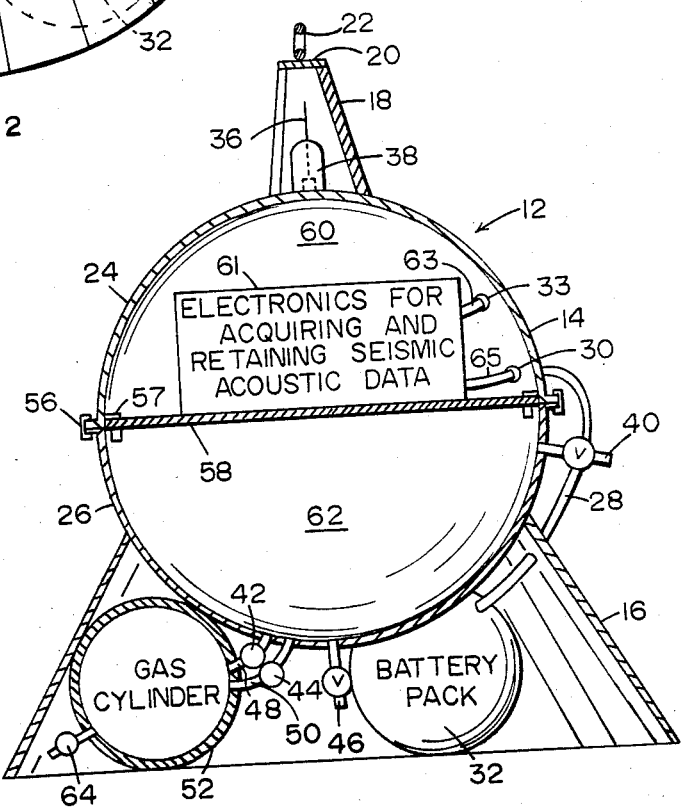
FIG. 2 is a sectional view of FIG. 1.

Referring now to FIG. 2, a sectional view of ocean bottom seismometer 12 is illustrated as bisecting spherical compartment 52.

FIG. 2 is a sectional view of ocean bottom seismometer 12 of FIG. 1 illustrating the compartmentalization of spherical compartment 14 into hemisphere 24 and hemisphere 26. A steel plate 58 is illustrated as sealed at ring 57 to hemisphere 24 isolating an electronic area 60 from a ballast area 62. Electronic unit 61 is illustrated as having a cable 63 connected to terminal 33 and a cable 65 connected to terminal 30. Cable 63, in conjunction with terminal 33, provides a means for supplying and removing data from ocean bottom seismometer 12 without opening hemisphere 24. Spherical compartment 14 can be opened by removing band 56. Plate 58 can be removed from hemisphere 24 to allow access to electronic unit 61 for repair and replacement. A fill valve 64 is illustrated on spherical compartment 52 to allow pressurization of compartment 52 between deployments. In the preferred embodiment, there are two hose systems having a high-pressure hose 48, and a high-pressure hose 50 connected through an electrically operated valve 42 and a mechanically operated valve 44, respectively.

Auxiliary compartment 32, having a power supply contained therein, is illustrated as being connected to electronic area 60 through electrical cable 28, which is brought through sealed terminal 30. A similar connection (not shown) may be used to connect auxiliary compartment 32 and auxiliary compartment 54. Compartment 54 may be used to hold additional batteries if necessary or a transponder 54a (as shown in FIG. 1) to activate spherical compartment 52 through electrically operated valve 42 via connector 42a.

Figure 3:
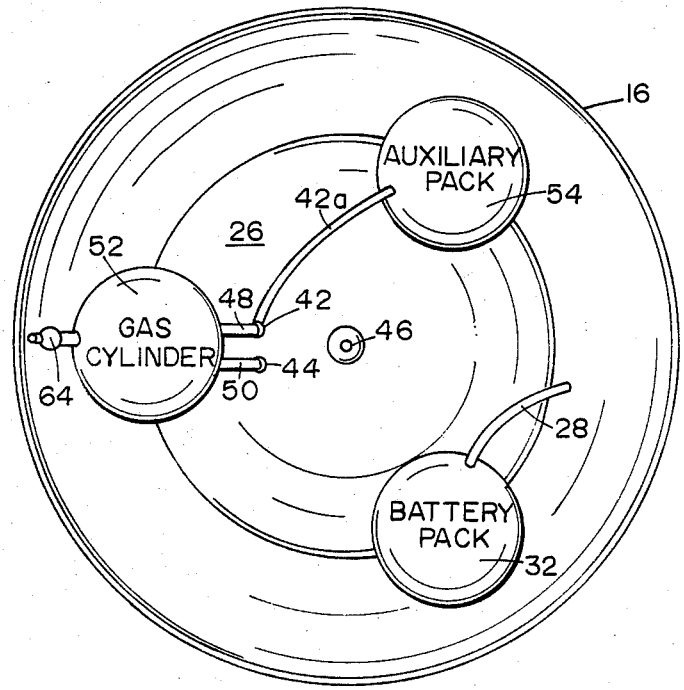
FIG. 3 is a bottom plan view of FIG. 1.
Figure 6:
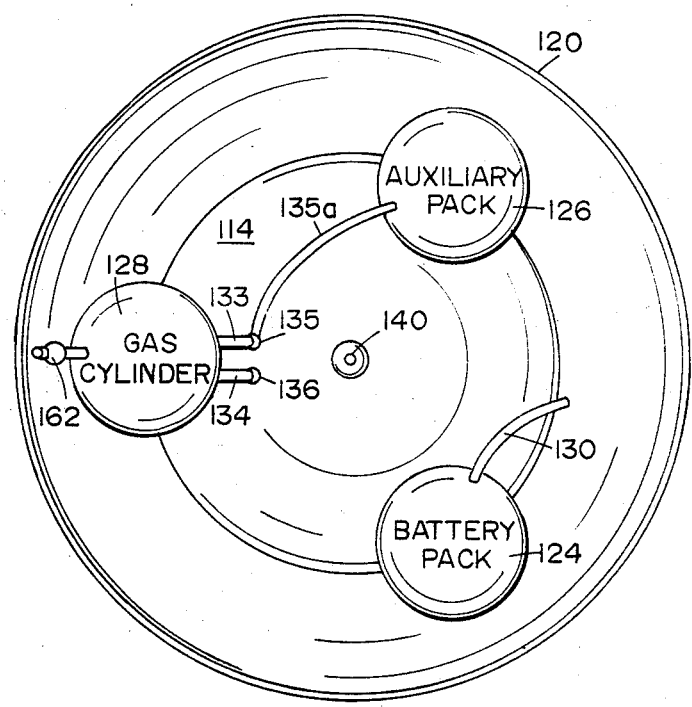
FIG. 6 is a bottom plan view of FIG. 4.

Referring now to FIG. 3, a bottom view of ocean bottom seismometer 12 is illustrated with skirt 16 fixed to hemisphere 26. Equally spaced around skirt 16 are spherical compartment 52 and auxiliary compartments 32 and 54, having their center lines spaced approximately 120° from each other along the circumference defined by skirt 16. By spacing compartments 32, 52 and 54 equally around skirt 16, the overall balance of ocean bottom seismometer 12 is maintained. Auxiliary compartment 52 preferably contains compressed gas, such as air. Spherical compartments 32 and 54 contain battery packs and transponders having weight approximately equal to the weight of the contents of spherical compartment 52. Thus, the lateral balance of ocean bottom seismometer 12 is maintained to assure that it will remain approximately vertical in decending from the ocean surface to the ocean floor.

In operation, ocean bottom seismometer 12 is prepared for deployment by filling hemisphere 26 with seawater through nozzle 40. The seawater provides ballast so that the overall volume comprising ocean bottom seismometer 12, spherical compartment 14, skirt 16 and compartments 32, 52 and 54 has a net negative buoyancy of fifty pounds. This may be calculated by determining the volumes of the compartments 32, 52 and 54 and one-half the volume of spherical compartment 14. The weight of the equivalent volume of water is subtracted from the weight of the ocean bottom seismometer 12 in air to obtain the net weight of ocean bottom seismometer 12 in water. The volume of one-half of spherical compartment 14 is neglected to calculate bottom weight since it is filled with seawater having neither a positive nor a negative effect on buoyancy once it is deployed. The volume of hemisphere 26 becomes important in calculating lift during retrieval. In deployment, ocean bottom seismometer 12 has a net bottom weight of fifty pounds. At retrieval, hemisphere 26 is filled with compressed gas, forcing the seawater ballast out. The weight of a volume of water equivalent to the volume of hemisphere 26 may be subtracted from the weight of ocean bottom seismometer 12 in water. The result of the subtraction should be negative to indicate a negative weight in water or a positive buoyancy.

As indicated, ocean bottom seismometer 12 is deployed by filling ballast area 62 within hemisphere 26 with seawater through nozzle 40. Ocean bottom seismometer 12 is then deployed by placing it in the ocean by lifting hook 22 and releasing it when it has been lowered below sea level. Ocean bottom seismometer 12, having a net bottom weight of 50 pounds, will sink to the ocean floor and remain in solid contact with the earth's surface throughout recording operations. Upon completion of recording seismic data, a transponder, which may be placed in auxiliary compartment 54, will receive a release signal and cause the compressed gas in spherical compartment 52 to be released into ballast area 62 through electrically operated valve 42. As a back up for retrieval of ocean bottom seismometer 12, mechanically operated valve 44 may be set to operate at a predetermined time to cause the compressed gas in gas compartment 52 to be released into ballast area 62. This may be accomplished by any one of many suitable mechanical timers known in the art. The compressed gas will force the seawater out through differential pressure relief valve 46. A differential-type valve is used since ocean bottom seismometer 12 may be used in depths up to 1,000 feet. The hydrostatic pressure is much greater at 1,000 feet than at the surface. As such, a differential valve will allow release of air pressure as ocean bottom seismometer 12 ascends to the surface. Since spherical compartment 52 contains an excess amount of compressed gas to completely fill ballast area 62, the releasing of excess gas in compartment 52 will force compressed gas out through differential pressure relief valve 46 which will act to break skirt 16 free of the ocean bottom in the event that the ocean bottom is extremely muddy, such as that found in the Mississippi Delta area.

As indicated previously, replacing seawater from ballast area 62 with compressed gas provides a minimum of fifty pounds' lift to assure that ocean bottom seismometer 12 will come to the surface. Once ocean bottom seismometer 12 reaches the surface, beacon 38 may be used to facilitate night location of ocean bottom seismometer 12, while antenna 36 transmits a homing signal to permit radio location of ocean bottom seismometer 12. Upon retrieval, acquired data may be withdrawn from electronic unit 61 by connecting a playback system, as is available in the art, to terminal 33.

Figure 4:
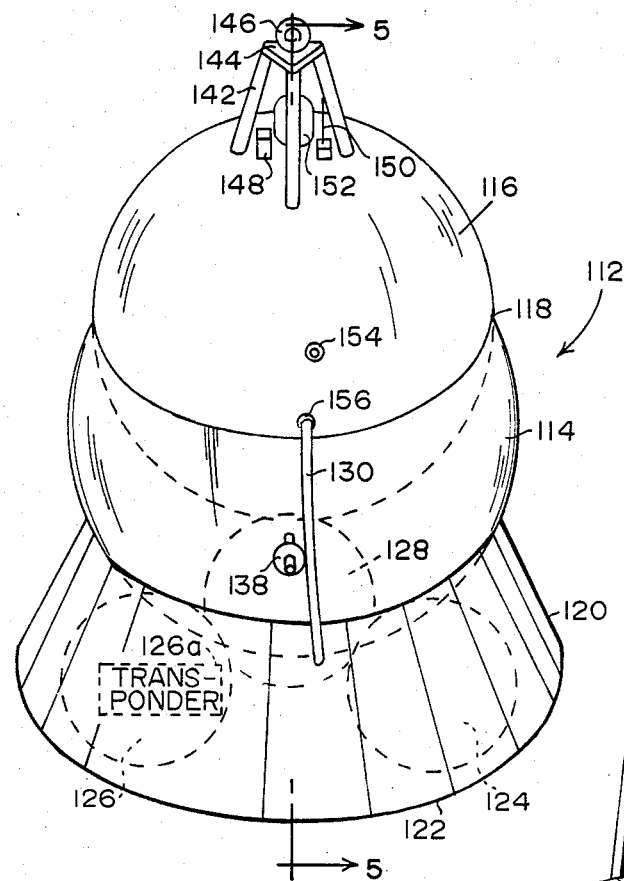
FIG. 4 is a perspective view of ocean bottom seismometer unit.

Referring now to FIG. 4, an alternate embodiment of the present invention is illustrated as ocean bottom seismometer 112 having a main compartment 114 and spherical electronic compartment 116 seated within a cutout portion 118 of main compartment 114. A conical skirt member 120 is fixed to the bottom of main compartment 114 to stabilize it and to elevate it above the horizontal plane defined by base 122 of skirt member 120. Within skirt member 120 are three spherical auxiliary compartments 124, 126 and 128. Compartment 124 is illustrated as having a cable 130 connected to terminal 156. Terminal 156 connects to cable 165 to electronics package 161. Compartment 126 may have a cable connection (not shown) to auxiliary compartment 124. Auxiliary compartment 128 has two high-pressure hose connections 133 and 134 to electrically operated valve 135 and mechanically operated valve 136, respectively. A fill nozzle 138 is illustrated on the upper portion and a differential pressure relief valve 140 is illustrated on the lower portion of main compartment 114. At the top of electronics compartment 116 is a tripod 142 having a triangular base 144 mounted thereon. A lifting hook 146 is fixed to base 144 for lifting ocean bottom seismometer 112 for deployment and retrieval. A hydrophone 148, antenna 150 and locator beacon 152 are mounted under and within tripod 142. A terminal 154 is illustrated on compartment 116 which receives cable 163 from the electronics package 161.

Figure 5:
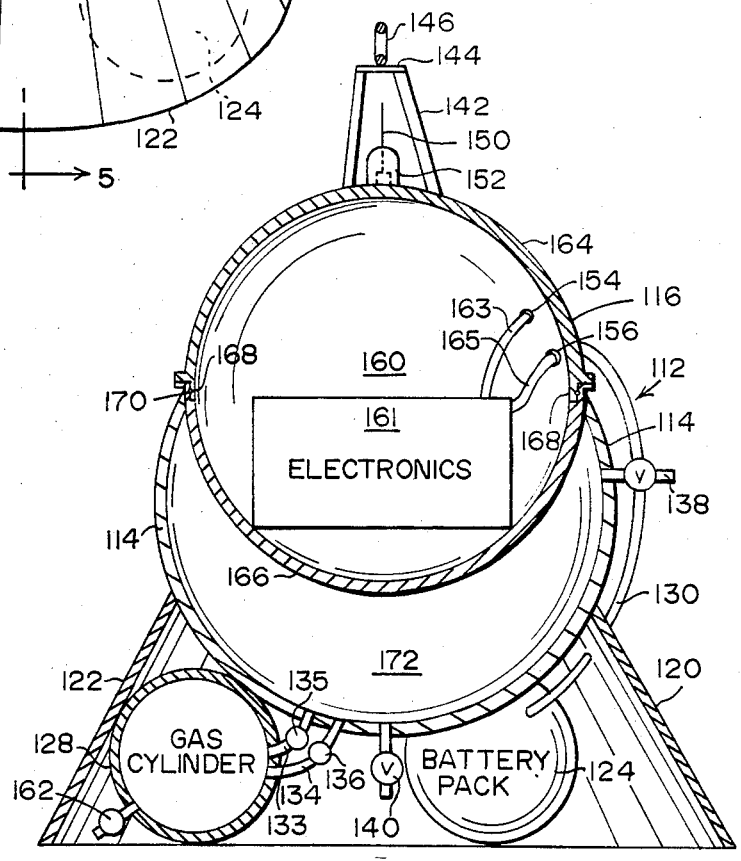
FIG. 5 is a sectional view of FIG. 4.

FIG. 5 is a sectional side view of FIG. 4 illustrating electronics package 161 mounted within electronics compartment 116. Electronics compartment 116 may be fitted into cutout portion 118 of main compartment 114 by either welding in place or by being bolted and sealed together. Bolting electronics compartment 116 to main compartment 114 is preferred to facilitate worldwide shipment of ocean bottom seismometer 112 for use and repair. Auxiliary compartments 124 and 128 are illustrated as mounted in the area defined by skirt member 120 and main compartment 114, similar to the manner in which compartments 32, 52 and 54 are mounted in the area defined by hemisphere 26 and skirt 16, as illustrated in FIG. 3.

Spherical electronics compartment 116 comprises two hemispherical sections 164 and 166 and fit together in a tongue-and-groove arrangement illustrated at 168. An O-ring 170 is placed between sections 164 and 166 to effectively seal the contents of spherical electronics compartment 116 from ambience. Sections 164 and 166 may be fitted together under vacuum conditions to hold them together, or clamped together, as illustrated by spherical compartment 14 and band 56 in FIGS. 1 and 2.

In operation, ocean bottom sesimometer 112 functions similarly to ocean bottom seismometer unit 12. Ballast in the form of seawater is placed in ballast chamber 172 through fill nozzle 138 prior to deployment. Ocean bottom seismometer 112 is lowered into the ocean by lifting hook 146. Upon completion of its data acquisition function, ocean bottom seismometer 112 may by retrieved by issuing a signal to a transponder 126a which may be located in auxiliary compartment 126. Two valves 135 and 136 are preferred. Duplication is used to assure ballast expulsion through differential pressure relief valve 140 and to aid in freeing ocean bottom seismometer 112 from any muddy formation in which it may be stuck. Electrically operated valve 135 releases compressed gas into ballast chamber 172 in response to an electric release signal from transponder 126a via electrical connector 135a while mechanically operated valve 136 releases compressed gas into ballast chamber 172 in response to elapsed time through a mechanical timer which is available commercially. After ballast expulsion through differential pressure relief valve 140 and ocean bottom seismometer 112 returns to the surface, it may be located by visual search for beacon 152 or radio search by detecting a radio frequency signal transmitted from antenna 150. When ocean bottom seismometer 112 is retrieved, acquired data may be withdrawn from data storage of electronics package 161 through terminal 154, as has been described.

While the present invention has been described by way of preferred embodiment, it is for illustration purposes only and it is to be understood as not limited thereto but only by the scope of the following claims.

What is claimed is:

1. An improved ocean bottom seismometer comprising:
    a spherical-shaped main housing having a seismic acquisition portion and a ballast portion below said acquisition portion, said ballast portion controlling ascent and descent of said ocean bottom seismometer;
    a conical skirt fixed to said main housing elevating said main housing above a horizontal plane coincident with a base of said skirt, said skirt capable of confining fluid under said main housing when said base rests on an ocean bottom;
    a plurality of spherical compartments mounted inside said skirt; and
    a lifting hook mounted on the outside of said main housing.

2. The ocean bottom seismometer of claim 1 wherein said ballast portion includes a relief valve at its lower portion approximately centered on an annular area defined by the intersection with said skirt.

3. The ocean bottom seismometer of claim 1 wherein said ballast portion includes a fill nozzle located on its upper portion.

4. The ocean bottom seismometer of claim 1 wherein one of said spherical compartments contains a power supply for supplying power to said seismic acquisition portion.

5. The ocean bottom seismometer of claim 1 wherein said seismic acquisition portion is a first hemispherical part of said main housing and said ballast portion is a second hemispherical part of said main housing.

6. The ocean bottom seismometer of claim 1 wherein said plurality of spherical compartments are mounted below said main housing and equally spaced along the circumference of said skirt.

7. The ocean bottom seismometer of claim 1 further comprising:
    a control valve; and
    a high pressure hose connected to said control valve;
    wherein one of said spherical compartments contains compressed gas and said spherical compartment containing compressed gas is connected to said ballast portion by said control valve and said high pressure hose.

8. The ocean bottom seismometer of claim 7 further comprising:
    a second control valve; and
    a second high pressure hose;
    wherein said spherical compartment containing compressed gas is further connected to said ballast portion by said second control valve and said second high pressure hose.

9. The ocean bottom seismometer of claim 8 wherein another of said plurality of spherical compartments contains a transponder for actuating one of said control valves.

10. A method for using an ocean bottom seismometer having a housing having a seismic acquisition portion and a ballast portion below said acquisition portion, said ballast portion controlling ascent and descent of said ocean bottom seismometer, a conical skirt fixed to said main housing elevating said main housing above a horizontal plane coincident with a base of said skirt, said skirt confining fluid under said main housing when said base rests on an ocean bottom, a plurality of spherical compartments mounted inside said skirt, and a lifting hook mounted on the outside of said main housing comprising the steps of:

filling said ballast portion with an incompressible fluid;

deploying said ocean bottom seismometer by placing it on the ocean floor;

acquiring seismic data in said seismic acquisition portion; and retrieving said ocean bottom seismometer by filling said ballast portion with said compressed gas.

11. The method according to claim 10 wherein said retrieving step includes the steps of:

filling said ballast portion with a supply of compressed gas; and expelling compressed gas in excess of the ambient pressure to aid dislodging of the ocean bottom seismometer from a resting position.

12. The method of claim 10 further comprising the step of retrieving said seismic data from said seismic acquisition portion of said ocean bottom seismometer.

13. An improved ocean bottom seismometer comprising:

a spherical main housing having a controllable fill nozzle, a differential pressure valve and a high-pressure hose connection;

a second spherical housing mounted partially within said main housing, said second housing having seismic data acquisition equipment sealed within said second spherical housing, said seismic data acquisition equipment capable of receiving power and data from and supplying data to outside connections;

a conical skirt mounted on said main housing opposite said second housing for stabilizing said main housing;

a first spherical compartment containing power supply packs mounted underneath said conical skirt, said spherical compartment having a hose connection to said second housing;

a second spherical compartment containing compressed gas connected to said high-pressure hose connection to said main housing; and a third spherical compartment containing an acoustic transponder controlling a high pressure hose valve in said high-pressure hose connection to said main housing.

14. The ocean bottom seismometer of claim 13 wherein said second housing includes means for accessing said seismic data acquisition equipment for repairs and replacement of said seismic data acquisition equipment.

15. The ocean bottom seismometer of claim 14 wherein said seismic data acquisition equipment includes:

a means for detecting seismic acoustic pulses; and an electronic means for acquiring and retaining seismic acousitic data.

16. The ocean bottom seismometer of claim 14 wherein said second housing is comprised of a first and a second hemispherical section in a removably sealed engagement.

* * * * *

UNITED STATES PATENT AND TRADEMARK OFFICE
CERTIFICATE OF CORRECTION

PATENT NO. : 4,692,906
DATED : September 8, 1987
INVENTOR(S) : Walter P. Neeley

It is certified that error appears in the above-identified patent and that said Letters Patent is hereby corrected as shown below:

On the title page and
Column 1, line 1, "Seisometer" should read -- Seismometer --.

Column 1, line 4, "seal" should read -- seals --.

Column 8, line 27, "repairs" should read -- repair --.

Column 8, line 35, "acousitic" should read -- acoustic --.

Signed and Sealed this

Sixteenth Day of February, 1988

Attest:

DONALD J. QUIGG

*Attesting Officer*   *Commissioner of Patents and Trademarks*